(12) United States Patent
Gill et al.

(10) Patent No.: US 12,548,154 B2
(45) Date of Patent: Feb. 10, 2026

(54) SYSTEM AND METHOD FOR DETERMINING SLEEP ANALYSIS BASED ON A BODY IMAGE (71) Applicant: ResMed Pty Ltd, Bella Vista (AU)

(72) Inventors: Christopher Andrew Wakeley Gill, Singapore (SG); Liam Holley, Bella Vista (AU); Jamie Graeme Wehbeh, Bella Vista (AU); Rowan Ben Furlong, Bella Vista (AU); Sarah Terese McGann, Bella Vista (AU); Stewart Joseph Wagner, Bella Vista (AU); Michael Christopher Hogg, Bella Vista (AU)

(73) Assignee: RESMED PTY LTD, Bella Vista (AU)

( * ) Notice: Subject to any disclaimer, the term of this patent is extended or adjusted under 35 U.S.C. 154(b) by 394 days.

(21) Appl. No.: 18/266,758

(22) PCT Filed: Dec. 10, 2021

(86) PCT No.: PCT/IB2021/061597
§ 371 (c)(1),
(2) Date: Jun. 12, 2023

(87) PCT Pub. No.: WO2022/123538
PCT Pub. Date: Jun. 16, 2022

(65) Prior Publication Data
US 2024/0046461 A1  Feb. 8, 2024

Related U.S. Application Data (60) Provisional application No. 63/124,577, filed on Dec. 11, 2020.

(51) Int. Cl.
G06K 9/00 (2022.01)
A61K 35/12 (2015.01)
(Continued)

(52) U.S. Cl.
CPC ........... *G06T 7/0012* (2013.01); *G16H 50/30* (2018.01); *G06T 2207/10016* (2013.01);
(Continued)

(58) Field of Classification Search
CPC ............. G06K 9/00; G06T 7/00; A61K 35/12
(Continued)

(56) References Cited

U.S. PATENT DOCUMENTS

2009/0043080 A1  2/2009  Clausen et al.
2009/0119337 A1*  5/2009  Biedermann .......... G16H 50/70
(Continued)

FOREIGN PATENT DOCUMENTS

ES  2386668 A1  8/2012
JP  2018517466 A  7/2018
(Continued)

OTHER PUBLICATIONS

Defining Phenotypic Causes of Obstructive Sleep Apnea Identification of Novel Therapeutic Targets Danny J. Eckert1,2, David P. White1, Amy (Year: 2013).*

(Continued)

*Primary Examiner* — Seyed H Azarian
(74) *Attorney, Agent, or Firm* — NIXON PEABODY LLP (57) ABSTRACT A system and method to determine a sleep disorder in a patient is disclosed. A storage device stores a digital image including a face and a neck of the patient. A database stores previously identified phenotypes and dimensions of facial and neck features. A sleep disorder analysis engine is coupled to the storage device and the database. The sleep disorder analysis engine is operable to identify features of the face and the neck from the image by determining landmarks on the image. The sleep disorder analysis engine classifies at least one phenotype from the image based on comparisons with the database. The sleep disorder analysis (Continued)

engine correlates the at least one phenotype and at least one feature with a sleep disorder. The sleep disorder analysis engine determines a risk score of the sleep disorder based on the correlation of the phenotype and the feature.

20 Claims, 5 Drawing Sheets

(51) Int. Cl.
*G06T 7/00* (2017.01)
*G16H 50/30* (2018.01)

(52) U.S. Cl.
CPC .............. *G06T 2207/20081* (2013.01); *G06T 2207/30004* (2013.01); *G06T 2207/30201* (2013.01)

(58) Field of Classification Search
USPC ....... 382/100, 103, 106, 128–133, 154, 156, 382/162, 168, 173, 181, 189, 224, 219, 382/254, 274, 285–291, 305, 321; 600/356, 383, 431
See application file for complete search history.

(56) References Cited

U.S. PATENT DOCUMENTS

| | | | | |
|---|---|---|---|---|
| 2019/0117151 A1* | 4/2019 | Stern | ...................... | G16H 20/40 |
| 2020/0013509 A1* | 1/2020 | Matharu | ................. | G16H 20/70 |
| 2020/0251213 A1* | 8/2020 | Tran | ........................ | G06N 20/20 |
| 2021/0236053 A1* | 8/2021 | Narayan | ................. | A61B 5/363 |
| 2021/0259765 A1* | 8/2021 | Narayan | ................. | G06N 3/084 |
| 2024/0257926 A1* | 8/2024 | Langel | ................... | G16H 10/20 |

FOREIGN PATENT DOCUMENTS

| | | | | |
|---|---|---|---|---|
| JP | 2019005252 A | | 1/2019 | |
| WO | WO2013098435 | * | 7/2013 | .............. G06T 7/60 |
| WO | 2017000031 A1 | | 1/2017 | |

OTHER PUBLICATIONS

International Search Report in International Patent Application No. PCT/IB2021/061597 mailed Mar. 2, 2022 (3 pp.).
Written Opinion in International Patent Application No. PCT/IB2021/061597 mailed Mar. 2, 2022 (6 pp.).

* cited by examiner

SYSTEM AND METHOD FOR DETERMINING SLEEP ANALYSIS BASED ON A BODY IMAGE

CROSS-REFERENCE TO RELATED APPLICATIONS

This application is a U.S. National Stage of International Application No. PCT/IB2021/061597, filed on Dec. 10, 2021, which claims the benefit of, and priority to, U.S. Provisional Patent Application No. 63/124,577 filed on Dec. 11, 2020, which are hereby incorporated by reference herein in their entireties.

TECHNICAL FIELD

The present disclosure relates generally to sleep disorder detection systems, and more specifically to an image analysis system to determine sleep disorders.

BACKGROUND

A range of respiratory disorders exist. Certain disorders may be characterized by particular events, such as apneas, hypopneas, and hyperpneas. Obstructive Sleep Apnea (OSA), a form of Sleep Disordered Breathing (SDB), is characterized by events including occlusion or obstruction of the upper air passage during sleep. It results from a combination of an abnormally small upper airway and the normal loss of muscle tone in the region of the tongue, soft palate and posterior oropharyngeal wall during sleep. The condition causes the affected patient to stop breathing for periods typically of 30 to 120 seconds in duration, sometimes 200 to 300 times per night. It often causes excessive daytime somnolence, and it may cause cardiovascular disease and brain damage. The syndrome is a common disorder, particularly in middle aged overweight males, although a person affected may have no awareness of the problem.

Other sleep related disorders include Cheyne-Stokes Respiration (CSR), Obesity Hyperventilation Syndrome (OHS) and Chronic Obstructive Pulmonary Disease (COPD). COPD encompasses any of a group of lower airway diseases that have certain characteristics in common. These include increased resistance to air movement, extended expiratory phase of respiration, and loss of the normal elasticity of the lung. Examples of COPD are emphysema and chronic bronchitis. COPD is caused by chronic tobacco smoking (primary risk factor), occupational exposures, air pollution and genetic factors.

Continuous Positive Airway Pressure (CPAP) therapy has been used to treat Obstructive Sleep Apnea (OSA). Application of continuous positive airway pressure acts as a pneumatic splint and may prevent upper airway occlusion by pushing the soft palate and tongue forward and away from the posterior oropharyngeal wall.

Non-invasive ventilation (NIV) provides ventilatory support to a patient through the upper airways to assist the patient in taking a full breath and/or maintain adequate oxygen levels in the body by doing some or all of the work of breathing. The ventilatory support is provided via a patient interface. NIV has been used to treat CSR, OHS, COPD, and Chest Wall disorders. In some forms, the comfort and effectiveness of these therapies may be improved. Invasive ventilation (IV) provides ventilatory support to patients that are no longer able to effectively breathe themselves and may be provided using a tracheostomy tube.

A treatment system may comprise a Respiratory Pressure Therapy Device (RPT device), an air circuit, a humidifier, a patient interface, and data management. A patient interface may be used to interface respiratory equipment to its wearer, for example by providing a flow of air to an entrance to the airways. The flow of air may be provided via a mask to the nose and/or mouth, a tube to the mouth or a tracheostomy tube to the trachea of a patient.

One issue is determining whether a potential patient has a sleep disorder. Although patients may self report, many patients will not report or even realize they have sleep disorders. Among patients, one current method is a medical questionnaire that collects information from a subjective feeling to attempt to diagnosis sleep disorder. Such questionnaires suffer from subjective answers leading to inaccurate information. Further, there is no guarantee that patients will either fill out or accurately fill out such questionnaires. Another mechanism to diagnosis sleep disorder is a sleep lab, where a patient may be observed during sleep. Although effective, sleep labs are relatively labor and resource intensive. Further, being observed makes many patients uncomfortable and thus there are challenges to convincing patients to be observed in a sleep lab.

There is a need for a system that allows for an accurate individualized determination of a sleep disorder. There is a need for a system that incorporates imaging data from a user to analyze a potential sleep disorder. There is also a need for a system that incorporates an image of a user with other sensor data to determine a sleep disorder.

SUMMARY

One disclosed example is a method that determines a sleep disorder in a patient. A digital image including a face and a neck of the patient is provided from a storage device. Features of the face and the neck from the image are measured by determining landmarks on the image. At least one phenotype is classified from the image from previously identified phenotypes stored in a database. The at least one phenotype and the measurements of at least one feature are correlated with a sleep disorder. A risk score of the sleep disorder is determined based on the correlation of the phenotype and the measurements of the at least one feature.

In other implementations of the disclosed example method, the image is provided by a camera of a mobile device. In another implementation, the example method includes providing multiple images including the face and neck of the patient. In another implementation, the example method includes measuring a physiological reading from the patient. The risk score of the sleep disorder is determined based partly on the physiological reading. In another implementation, the correlation is performed with a machine learning model trained with images from a patient population and a sleep disorder score of each of the patient population. In another implementation, the example method includes storing the image, classified phenotype, dimensions of the feature and sleep disorder score. The method also includes updating a database of the patient population with the stored classified phenotype, dimensions of the features, and sleep disorder score for the patient. In another implementation, the sleep disorder is one of Obstructive Sleep Apnea (OSA), a form of Sleep Disordered Breathing (SDB), Cheyne-Stokes Respiration (CSR), Obesity Hyperventilation Syndrome (OHS) and Chronic Obstructive Pulmonary Disease (COPD). In another implementation, the example method includes determining a risk score of a co-morbidity based on the at least one phenotype. In another implementation, the example method includes providing a video of the patient and determining dynamic movement of one of the features. The risk score of the sleep disorder is determined with the dynamic movement. In another implementation, the phenotype is coded by a color on the image, and the image and the color code is displayed on a display. In another implementation, the color code on the phenotype represents degree of correlation with the sleep disorder. In another implementation, the at least one phenotype is one of obesity/neck circumference, inset jaw/mandibular, and crowded/narrow upper airway. In another implementation, the example method includes matching a treatment for the sleep disorder based on the determined phenotype. In another implementation, the example method includes determining a severity of the sleep disorder based on the determined sleep disorder score; and determining a therapy based on the severity of the sleep disorder. In another implementation, the feature is a neck dimension. The neck dimension is correlated to a tissue mass and a stiffness parameter. The sleep disorder correlation relates to the tissue mass and the stiffness parameter.

Another disclosed example is a computer program product comprising instructions which, when executed by a computer, cause the computer to carry out the above described methods. Another implementation is where the computer program product is a non-transitory computer readable medium.

Another disclosed example is a system to determine a sleep disorder in a patient. The system includes a storage device storing a digital image including a face and a neck of the patient. A database stores previously identified phenotypes and dimensions of facial and neck features. The system includes a sleep disorder analysis engine coupled to the storage device and the database. The sleep disorder analysis engine identifies features of the face and the neck from the image by determining landmarks on the image. The engine classifies at least one phenotype from the image based on comparisons with the database. The engine correlates the at least one phenotype and at least one feature with a sleep disorder. The engine determines a risk score of the sleep disorder based on the correlation of the phenotype and the feature.

In other implementations of the disclosed example system, the image is provided by a camera of a mobile device. In another implementation, the storage device stores multiple images including the face and neck of the patient. In another implementation, the example system includes a sensor interface coupled to the sleep disorder analysis machine and a sensor measuring a physiological reading from the patient. The risk score of sleep disorder is determined based partly on the physiological reading. In another implementation, the correlation is performed with a machine learning model trained with images from a patient population and a sleep disorder score of each of the patient population. In another implementation, the sleep disorder analysis engine stores the image, classified phenotype, dimensions of the feature, and sleep disorder score. The engine updates the database with the stored classified phenotype, dimensions of the features, and sleep disorder score for the patient. In another implementation, the sleep disorder is one of Obstructive Sleep Apnea (OSA), a form of Sleep Disordered Breathing (SDB), Cheyne-Stokes Respiration (CSR), Obesity Hyperventilation Syndrome (OHS) and Chronic Obstructive Pulmonary Disease (COPD). In another implementation, the sleep disorder analysis engine determines a risk score of a co-morbidity based on the phenotype. In another implementation, the storage device includes a video of the patient. The sleep disorder analysis engine determines dynamic movement of one of the features from the video, and wherein the risk score of sleep disorder is determined with the dynamic movement. In another implementation, the phenotype is coded by a color on the image, and wherein the image and the color code is displayed on a display. In another implementation, the color code on the phenotype represents a degree of correlation with the sleep disorder. In another implementation, the phenotype is selected from obesity/neck circumference, inset jaw/mandibular, and crowded/narrow upper airway. In another implementation, the sleep disorder analysis engine matches a treatment for the sleep disorder based on the determined phenotype. In another implementation, the sleep disorder analysis engine determines a severity of the sleep disorder based on the determined sleep disorder score; and determines a therapy based on the severity of the sleep disorder. In another implementation, the feature is a neck dimension. The neck dimension is correlated to a tissue mass and a stiffness parameter, and the sleep disorder correlation relates to the tissue mass and the stiffness parameter.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure allows patients to more quickly and conveniently obtain a diagnosis of a sleep disorder by correlating sources of data that may be obtained with a minimum of effort by a patient. Examples of sleep disorders may include Obstructive Sleep Apnea (OSA), a form of Sleep Disordered Breathing (SDB), Cheyne-Stokes Respiration (CSR), Obesity Hyperventilation Syndrome (OHS) and Chronic Obstructive Pulmonary Disease (COPD). The image of different body features may be determined analyzed from a patient population with features of the individual patient determined by a scanning process. The scanning process allows a patient quickly measure their anatomy from the comfort of their own home using a computing device, such as a desktop computer, tablet, smart phone or other mobile device. Additional characteristics relating to sleep disorders may be analyzed from the scanned anatomical images.

In a beneficial embodiment, the present technology may employ an application downloadable from a manufacturer or a third party server to a smartphone or tablet with an integrated camera. When launched, the application may provide visual and/or audio instructions. As instructed, the user (i.e. a patient) may stand in front of a mirror, and press the camera button on a user interface. An activated process may then take a series of pictures of the patient, and then, within a matter of seconds for example, obtain facial, neck, or other dimensions for selection of an interface (based on the processor analyzing the pictures).

A user/patient may capture an image or series of images of their anatomy. Instructions provided by an image analysis application stored on a computer-readable medium, such as when executed by a processor, detect various landmarks within the images, measure and scale the distance between such landmarks, and record these distances and other metrics to a data record. The measurements of features may be related to analysis of a sleep disorder. The landmarks and features may also be used to classify phenotypes that may be related to sleep disorders. The application may also collect other sleep disorder related data from the patient such as physiological and demographic data that may be used by the image analysis engine to generate a sleep disorder score for the patient.

Figure 1:
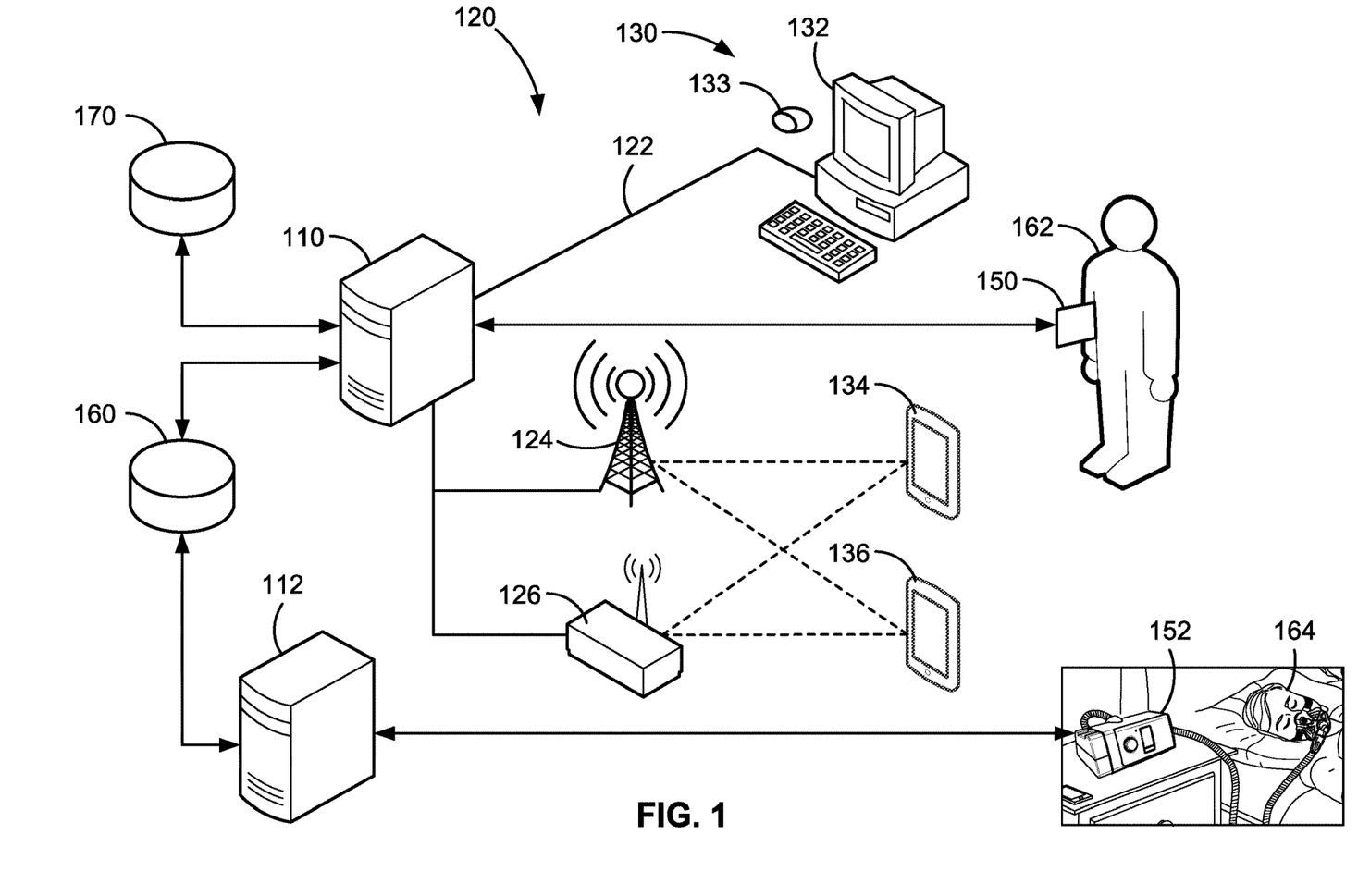
FIG. 1 shows a system that collects data relating to sleep disorders.

FIG. 1 depicts an example data collection system 100 that may be implemented for automatic body feature measurements from patient images, and provision of patient sleep disorder analysis. The data collection system 100 may generally include one or more of servers 110, a communication network 120, and a computing device 130. The server 110 and computing device 130 may communicate via communication network 120, which may be a wired network 122, wireless network 124, or wired network with a wireless link 126. In some versions, server 110 may communicate one-way with computing device 130 by providing information to computing device 130, or vice versa. In other embodiments, server 110 and computing device 130 may share information and/or processing tasks. The system may be implemented, for example, to permit analysis of facial or other body image to determine sleep disorders described in more detail herein.

A database 160 is provided to collect data on a patient population represented by a patient 162. An external database 170 may include additional relevant collected data relating to the patient that may be accessed by the server 110 for the purpose of sleep disorder analysis. The patient 162 may have access to the computing device 130 or other mobile computing devices such as a mobile phone 134 or a tablet 136. In this example, the patient 162 may wear a physiological sensor 150 that collects physiological data. The sensor 150 may include heart rate sensors, oxygen level sensors, ECG sensors, pulse rate sensors, and the like. The sensor 150 may communicate with a computing device such as the mobile phone 134 to record physiological data specifically during sleep periods. As will be explained, the system 100 allows collection of data to diagnosis whether the patient 162 may suffer from a sleep disorder.

A second population of patients represented by a patient 164 have been previously diagnosed with sleep disorders. Such patients 164 may be undergoing treatment for the sleep disorder, such as in the form of a respiratory therapy device (RPT) 152. Examples of an RPT may be a Continuous Positive Airway Pressure (CPAP) device with both operational sensors that monitor the operation of the device and patient based sensors that record patient physiological responses to the device. In this example, data is collected from the second population of patients 164 to determine correlation to allow analysis of other patients for sleep disorder. The data may include physiological data, facial and neck image data, and demographic data. Treatment data such as data collected by the RPT 152 may be correlated with the severity and type of sleep disorder for the second group of patients. Such correlations with sleep disorders may be made via an example machine learning server 112. The patients 164 in the second population of patients may also have access to computing devices such as the computing device 130 or other mobile computing devices such as the mobile phone 134 or the tablet 136. Image data, physiological data, and treatment data may be collected via such devices for the patients 164.

The machine learning server 112 and or the computing device 130 may also be in communication with the respiratory therapy device such as an RPT 152. The RPT device 152 in this example collects operational data in relation to patient use, mask leaks, and other relevant data to provide feedback in relation to mask use and thus the treatment for sleep disorders such as OSA. The data from the RPT devices 152 is collected and correlated with the individual patient data of the patient 164 using the RPT devices 152 in a patient database 160.

A sleep disorder analysis engine executed by the server 110 is used to correlate and determine potential sleep disorders from image data and additional data from the first group of patients represented by the patient 162. The machine learning server 112 may access the database 160 for the purpose of providing machine learning models for better data correlation with sleep disorders. As will be explained in detail, the sleep disorder analysis engine receives stored image data and accesses a database of data such as phenotypes from a patient population correlated to a sleep disorder. the sleep disorder analysis engine identifies anatomical features of a patient image by determining landmarks on the image. Such anatomical features may include those on the face and the neck from the image. The analysis engine classifies at least one phenotype from the image based on comparisons with the database. The phenotype and at least one feature with a sleep disorder are correlated. A risk score of the sleep disorder is determined based on the correlation of the phenotype and the feature.

Thus, relevant data may be correlated with anatomical dimensional data for a new patient derived from points identified from images of the patient. As will be explained, the server 110 executes the sleep disorder analysis engine by collecting the data from multiple patients stored in the database 160 and outputting a likelihood of sleep disorder for each of the patients.

Figure 2:
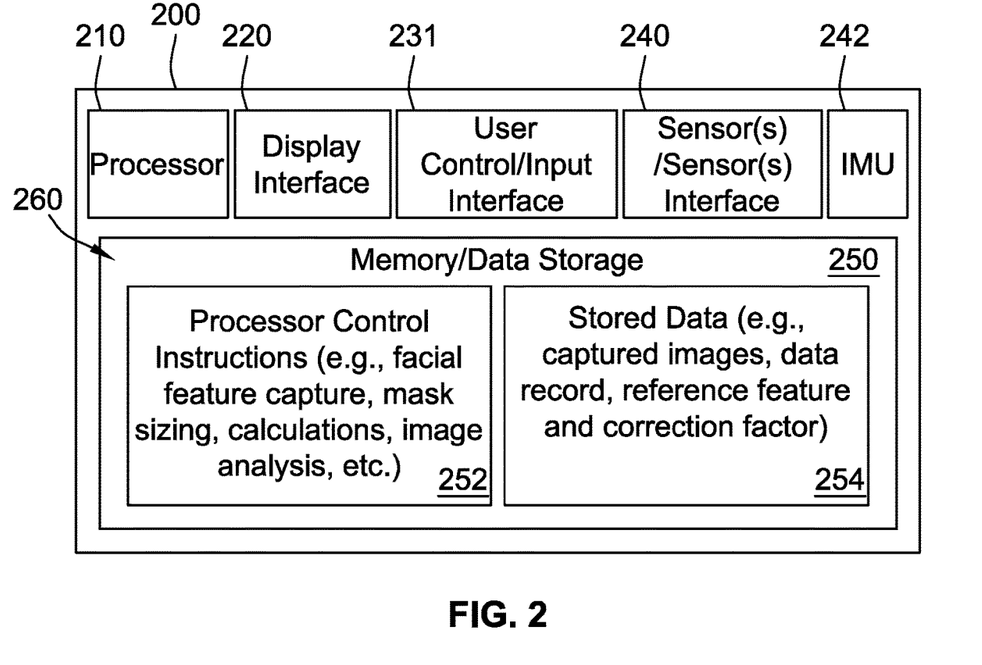
FIG. 2 is a diagram of the components of a computing device used to capture facial data.

The computing device 130 can be a desktop or laptop computer 132 or a mobile device, such as the smartphone 134 or the tablet 136. FIG. 2 depicts the general architecture 200 of the computing device 130. The computing device 130 may include one or more processors 210. The computing device 130 may also include a display interface 220, a user control/input interface 231, a sensor 240 and/or a sensor interface for one or more sensor(s), an inertial measurement unit (IMU) 242 and a non-volatile memory/data storage 250.

Sensor 240 may be one or more cameras (e.g., a CCD charge-coupled device or active pixel sensors) that are integrated into computing device 130, such as those provided in a smartphone or in a laptop. Alternatively, where computing device 130 is a desktop computer, device 130 may include a sensor interface for coupling with an external camera, such as the webcam 133 depicted in FIG. 1. Other exemplary sensors that could be used to assist in the methods described herein that may either be integral with or external to the computing device include stereoscopic cameras, for capturing three-dimensional images, or a light detector capable of detecting reflected light from a laser or strobing/structured light source.

User control/input interface 231 allows the user to provide commands or respond to prompts or instructions provided to the user. This could be a touch panel, keyboard, mouse, microphone, and/or speaker, for example.

Display interface 220 may include a monitor, LCD panel, or the like to display prompts, output information (such as facial measurements or interface size recommendations), and other information, such as a capture display, as described in further detail below.

Memory/data storage 250 may be the computing device's internal memory, such as RAM, flash memory or ROM. In some embodiments, memory/data storage 250 may also be external memory linked to computing device 130, such as an SD card, server, USB flash drive or optical disc, for example. In other embodiments, memory/data storage 250 can be a combination of external and internal memory. Memory/data storage 250 includes stored data 254 and processor control instructions 252 that instruct processor 210 to perform certain tasks. Stored data 254 can include data received by sensor 240, such as a captured image, and other data that is provided as a component part of an application. Processor control instructions 252 can also be provided as a component part of an application.

As explained above, a body image such as a face or a neck image may be captured by a mobile computing device such as the smartphone 134. An appropriate application executed on the computing device 130 or the server 110 can provide three-dimensional relevant facial and other anatomical data to assist in determining a sleep disorder. The application may use any appropriate method of facial scanning Such applications may include the Capture from StandardCyborg (https://www.standardcyborg.com/), an application from Scandy Pro (https://www.scandy.co/products/scandy-pro), the Beauty3D application from Qianxun3d (https://www.qianxun3d.com/scanpage), the Unre 3D FaceApp (https://www.unre.ai/index.php?route=ios/detail) and an application from Bellus3D (https://www.bellus3d.com/) A detailed process of facial scanning include the techniques disclosed in WO 2017000031, hereby incorporated by reference in its entirety.

The imaging routines may be combined with a 3D facial model to estimate dimensions. For example, a 3D scanner or depth sensor on a mobile device such as the True Depth camera on an Apple phone may be used to capture 3D images. Multiple 3D images may be captured to create an accurate 3D model. For example, one way of capturing a series of images is by turning the head left and right whilst keeping the rest of the body (neck down) fixed. This is an issue as it results in distortions in the neck and errors when a 3D model is reconstructed. To mitigate this, 3D images may be captured holding the head, neck and body fixed (i.e. not rotating with respect to one another) whilst the entire camera unit rotates along the longitudinal axis. One example of this method may be having the user sit on a swivel chair. The device with the camera may be mounted on a stand and take a series of 3D images while swiveling the chair slowly. This ensures that the 3D camera captures the face and head features well for accurate reconstruction of a 3D model.

One such application is an application for facial feature measuring and/or patient interface sizing 260, which may be an application downloadable to a mobile device, such as smartphone 134 and/or tablet 136. The application 260, which may be stored on a computer-readable medium, such as memory/data storage 250, includes programmed instructions for processor 210 to perform certain tasks related to anatomical feature measuring and/or patient sizing. The application also includes data that may be processed by the algorithm of the automated methodology. Such data may include a data record, reference feature, and correction factors, as explained in additional detail below.

The application 260 is executed by the processor 210, to measure anatomical details such as patient facial and neck features using two-dimensional or three-dimensional images. The method may generally be characterized as including three or four different phases: a pre-capture phase, a capture phase, a post-capture image processing phase, and a comparison and output phase.

In some cases, the application for facial feature measuring and patient interface sizing may control a processor 210 to output a visual display that includes a reference feature on the display interface 220. The user may position the feature adjacent to their facial features, such as by movement of the camera. The processor may then capture and store one or more images of the facial features in association with the reference feature when certain conditions, such as alignment conditions are satisfied. This may be done with the assistance of a mirror. The mirror reflects the displayed reference feature and the user's face to the camera. The application then controls the processor 210 to identify certain facial features within the images and measure distances therebetween. By image analysis processing a scaling factor may then be used to convert the facial feature measurements, which may be pixel counts, to standard mask measurement values based on the reference feature. Such values may be, for example, standardized unit of measure, such as a meter or an inch, and values expressed in such units suitable for mask sizing.

Additional correction factors may be applied to the measurements. The facial feature measurements may be compared to data records that include measurement ranges corresponding to different patient interface sizes for particular patient interface forms, such as nasal masks and FFMs, for example. The recommended size may then be chosen and be output to the user/patient based on the comparison(s) as a recommendation. Such a process may be conveniently affected within the comfort of any preferred user location. The application may perform this method within seconds. In one example, the application performs this method in real time.

In the pre-capture phase, the processor 210, among other things, assists the user in establishing the proper conditions for capturing one or more images for sizing processing. Some of these conditions include proper lighting and camera orientation and motion blur caused by an unsteady hand holding the computing device 230, for example.

A user may conveniently download an application for performing the automatic measuring and sizing at computing device 130 from a server, such as a third party application-store server, onto their computing device 130. When downloaded, such application may be stored on the computing device's internal non-volatile memory, such as RAM or flash memory. Computing device 230 is preferably a mobile device, such as smartphone 134 or tablet 136.

When the user launches the application, processor 210 may prompt the user via the display interface 220 to provide patient specific information, such as age, gender, weight, and height, lifestyle factors (e.g., diet, use of alcohol, opiates, other drugs, history of smoking, physical and mental activity patterns, occupation, exposure to pollution, and geographic location) related to diagnosing a sleep disorder. However, the processor 210 may prompt to the user to input this information at any time, such as after the user's facial features are measured. The processor 210 may also present a tutorial, which may be presented audibly and/or visually, as provided by the application to aid the user in understanding their role during the process. The prompts may also require information for patient interface type, e.g. nasal or full face, etc. and of the type of device for which the patient interface will be used. Also, in the pre-capture phase, the application may extrapolate the patient specific information based on information already gathered by the user, such as after receiving captured images of the user's face, and based on machine learning techniques or through artificial intelligence.

When the user is prepared to proceed, which may be indicated by a user input or response to a prompt via user control/input interface 231, the processor 210 activates the sensor 240 as instructed by the application's processor control instructions 252. The sensor 240 is preferably the forward facing camera of the mobile device, which is located on the same side of the mobile device as the display interface 220. The camera is generally configured to capture two-dimensional images. Mobile device cameras that capture two-dimensional images are ubiquitous. The present technology takes advantage of this ubiquity to avoid burdening the user with the need to obtain specialized equipment.

Around the same time sensor/camera 240 is activated, processor 210, as instructed by the application 260, presents a capture display on the display interface 220. The capture display may include a camera live action preview, a reference feature, a targeting box, and one or more status indicators or any combination thereof. In this example, the reference feature is displayed centered on the display interface and has a width corresponding to the width of the display interface 320. The vertical position of the reference feature may be such that the top edge of reference feature abuts the upper most edge of the display interface 220 or the bottom edge of reference feature abuts the lower most edge of the display interface 220. A portion of the display interface 220 will display a camera live action preview, typically showing the facial and neck features captured by sensor/camera 240 in real time if the user is in the correct position and orientation.

The reference feature is a feature that is known to computing device 130 (predetermined) and provides a frame of reference to processor 210 that allows processor 210 to scale captured images. The reference feature may preferably be a feature other than a facial or anatomical feature of the user. Thus, during the image processing phase, the reference feature assists processor 210 in determining when certain alignment conditions are satisfied, such as during the pre-capture phase. The reference features may be a quick response (QR) code or known exemplar or marker, which can provide processor 210 certain information, such as scaling information, orientation, and/or any other desired information which can optionally be determined from the structure of the QR code. The QR code may have a square or rectangular shape. When displayed on display interface 220, the reference feature has predetermined dimensions, such as in units of millimeters or centimeters, the values of which may be coded into the application and communicated to processor 210 at the appropriate time. The actual dimensions of a reference feature may vary between various computing devices. In some versions, the application may be configured to be a computing device model-specific in which the dimensions of the reference feature, when displayed on the particular model, is already known. However, in other embodiments, the application may instruct the processor 210 to obtain certain information from device 130, such as display size and/or zoom characteristics that allow the processor 210 to compute the real world/actual dimensions of the reference feature as displayed on display interface 220 via scaling. Regardless, the actual dimensions of the reference feature as displayed on the display interfaces 220 of such computing devices are generally known prior to post-capture image processing.

Along with the reference feature, a targeting box may be displayed on display interface 220. The targeting box allows the user to align certain components within capture display 222 in targeting box, which is desired for successful image capture.

The status indicator provides information to the user regarding the status of the process. This helps ensure the user does not make major adjustments to the positioning of the sensor/camera prior to completion of image capture.

Thus, when the user holds the display interface 220 parallel to the anatomical features to be measured and presents user display interface 220 to a mirror or other reflective surface, the reference feature is prominently displayed and overlays the real-time images seen by the camera/sensor 240 and as reflected by the mirror. This reference feature may be fixed near the top of display interface 220. The reference feature is prominently displayed in this manner at least partially so that the sensor 240 can clearly see the reference feature so that the processor 210 can easily the identify feature. In addition, the reference feature may overlay the live view of the face and neck of the user, which helps avoid user confusion.

The user may also be instructed by the processor 210, via the display interface 220, by audible instructions via a speaker of the computing device 130, or be instructed ahead of time by the tutorial, to position the display interface 220 in a plane of the anatomical features to be measured. As the images ultimately captured are two-dimensional, planar alignment helps ensure that the scale of the reference feature is equally applicable to the facial feature measurements. In this regard, the distance between the minor and both of the user's facial features and the display will be approximately the same.

When the user is positioned in front of a minor, and the display interface 220, which includes the reference feature, is roughly placed in planar alignment with the anatomical features to be measured, the processor 210 checks for certain conditions to help ensure sufficient alignment. One exemplary condition that may be established by the application, as previously mentioned, is that the entirety of the reference feature must be detected within targeting box 228 in order to proceed. If processor 210 detects that the reference feature is not entirely positioned within targeting box, the processor 210 may prohibit or delay image capture. The user may then move their face or neck along with the display interface 220 to maintain planarity until the reference feature, as displayed in the live action preview, is located within targeting box. This helps optimized alignment of the features and display interface 220 with respect to the mirror for image capture.

When processor 210 detects the entirety of the reference feature within targeting box, the processor 210 may read the IMU 242 of the computing device for detection of device tilt angle. The IMU 242 may include an accelerometer or gyroscope, for example. Thus, the processor 210 may evaluate device tilt such as by comparison against one or more thresholds to ensure it is in a suitable range. For example, if it is determined that computing device 130, and consequently display interface 220 and the desired features, is tilted in any direction within about ±5 degrees, the process may proceed to the capture phase. In other embodiments, the tilt angle for continuing may be within about ±10 degrees, ±7 degrees, ±3 degrees, or ±1 degree. If excessive tilt is detected a warning message may be displayed or sounded to correct the undesired tilt. This is particularly useful for assisting the user to help prohibit or reduce excessive tilt, particularly in the anterior-posterior direction, which if not corrected, could pose as a source of measuring error as the captive reference image will not have a proper aspect ratio.

When alignment has been determined by the processor 210 as controlled by the application, processor 210 proceeds into the capture phase. The capture phase preferably occurs automatically once the alignment parameters and any other conditions precedent are satisfied. However, in some embodiments, the user may initiate the capture in response to a prompt to do so.

When image capture is initiated, the processor 210 via the sensor 240 captures a number n of images, which is preferably more than one image. For example, the processor 210 via sensor 240 may capture about 5 to 20 images, 10 to 20 images, or 10 to 15 images, etc. The quantity of images captured may be time-based. In other words, the number of images that are captured may be based on the number of images of a predetermined resolution that can be captured by the sensor 240 during a predetermined time interval. For example, if the number of images the sensor 240 can capture at the predetermined resolution in 1 second is 40 images and the predetermined time interval for capture is 1 second, the sensor 240 will capture 40 images for processing with processor 210. The quantity of images may be user-defined, determined by the server 110 based on artificial intelligence or machine learning of environmental conditions detected, or based on an intended accuracy target. For example, if high accuracy is required then more captured images may be required. Although, it is preferable to capture multiple images for processing, one image is contemplated and may be successful for use in obtaining accurate measurements. However, more than one image allows average measurements to be obtained. This may reduce error/inconsistencies and increase accuracy. The images may be placed by processor 210 in the stored data 254 of the memory/data storage 250 for post-capture processing.

Once the images are captured, the images are processed by processor 210 to detect or identify anatomical features/landmarks and measure distances therebetween. The resultant measurements may be analyzed for correlation with sleep disorders. Other analysis such as phenotype classification may be performed by analysis of the images. This processing may alternatively be performed by server 110 receiving the transmitted captured images and/or on a computing device (e.g., smart phone) operated by the user. Processing may also be undertaken by a combination of the processor 210 and the server 110.

The processor 210, as controlled by the application, retrieves one or more captured images from stored data 254. The image is then extracted by processor 210 to identify each pixel comprising the two-dimensional captured image. The processor 210 then detects certain pre-designated facial features within the pixel formation.

Detection may be performed by the processor 210 using edge detection, such as Canny, Prewitt, Sobel, or Robert's edge detection, for example. For example, these edge detection techniques/algorithms help identify the location of certain facial and neck features within the pixel formation, which correspond to the actual facial and neck features as presented for image capture. For example, the edge detection techniques can first identify the face within the image and also identify pixel locations within the image corresponding to specific facial and neck features, such as each eye and borders thereof, the mouth and corners thereof, left and right alares, sellion, supramenton, glabella and left and right nasolabial sulci, etc. The processor 210 may then mark, tag or store the particular pixel location(s) of each of these features. Alternatively, or if such detection by processor 210/server 110 is unsuccessful, the pre-designated facial and neck features may be manually detected and marked, tagged or stored by a human operator with viewing access to the captured images through a user interface of the processor 210/server 110.

Once the pixel coordinates for these facial features are identified, the application 260 controls the processor 210 to measure the pixel distance between certain of the identified features. For example, the distance may generally be determined by the number of pixels for each feature and may include scaling. For example, measurements between the left and right alares may be taken to determine pixel width of the nose and/or between the sellion and supramenton to determine the pixel height of the face. Another example may be the measurement of tongue fat, neck circumference and skeletal parameters. Other examples include pixel distance between each eye, between mouth corners, and between left and right nasolabial sulci to obtain additional measurement data of particular structures like the mouth. Further distances between facial and neck features can be measured. In this example, certain facial and neck dimensions are used to analyze the likelihood of a sleep disorder. Skeletal parameters may be predicted from the dimensions and the results of a cephalometric analysis may be correlated with obstructions caused by obstructive sleep apnea. The measurements and corresponding anatomical features may be correlated to sleep disorders through machine learning analysis.

Once the pixel measurements of the pre-designated facial and neck features are obtained, an anthropometric correction factor(s) may be applied to the measurements. It should be understood that this correction factor can be applied before or after applying a scaling factor, as described below. The anthropometric correction factor can correct for errors that may occur in the automated process, which may be observed to occur consistently from patient to patient. The correction factor, which may be empirically extracted from population testing, shifts the results closer to a true measurement helping to reduce or eliminate mis-sizing. This correction factor can be refined or improved in accuracy over time as measurement and sizing data for each patient is communicated from respective computing devices to the server 110 where such data may be further processed to improve the correction factor.

The measurements may be scaled from pixel units to other values that accurately reflect the distances between the facial or neck features of the patient as presented for image capture. The reference feature may be used to obtain a scaling value or values. Thus, the processor 210 similarly determines the reference feature's dimensions, which can include pixel width and/or pixel height (x and y) measurements (e.g., pixel counts) of the entire reference feature. More detailed measurements of the pixel dimensions of the many squares/dots that comprise a QR code reference feature, and/or pixel area occupied by the reference feature and its constituent parts may also be determined. Thus, each square or dot of the QR code reference feature may be measured in pixel units to determine a scaling factor based on the pixel measurement of each dot and then averaged among all the squares or dots that are measured, which can increase accuracy of the scaling factor as compared to a single measurement of the full size of the QR code reference feature. However, it should be understood that whatever measurements are taken of the reference feature, the measurements may be utilized to scale a pixel measurement of the reference feature to a corresponding known dimension of the reference feature.

Once the measurements of the reference feature are taken by the processor 210, the scaling factor is calculated by the processor 210 as controlled by the application. The pixel measurements of reference feature are related to the known corresponding dimensions of the reference feature as displayed by the display interface 220 for image capture, to obtain a conversion or scaling factor. Such a scaling factor may be in the form of length/pixel or area/pixelA2. In other words, the known dimension(s) may be divided by the corresponding pixel measurement(s) (e.g., count(s)).

The processor 210 then applies the scaling factor to the facial feature measurements (pixel counts) to convert the measurements from pixel units to other units to reflect distances between the actual features. This may typically involve multiplying the scaling factor by the pixel counts of the distance(s) for facial and neck features related to possible sleep disorders.

These measurement steps and calculation steps for both the facial and the neck features and the reference feature are repeated for each captured image until each image in the set has feature measurements that are scaled and/or corrected.

The corrected and scaled measurements for the set of images may then optionally be averaged by processor 210 to obtain final measurements of the facial and neck anatomy of the patient. Such measurements may reflect distances between features on the face and neck of the patient.

In the comparison and output phase, results from the post-capture image processing phase may be directly output (displayed) to a person of interest or compared to data record(s) to obtain a likelihood of a sleep disorder. The data may also be used to determine an optimal therapy or treatment for a sleep disorder.

Once all of the measurements are determined, the results (e.g., averages) may be displayed by processor 210 to the user via display interface 220. In one embodiment, this may end the automated process. The user/patient can record the measurements for further use by the user.

Alternatively, the final measurements may be forwarded either automatically or at the command of the user to the server 110 from the computing device 130 via the communication network 120. The server 110 or individuals on the server-side may conduct further processing and analysis to determine a suitable patient interface and patient interface size.

In a further embodiment, the final facial and neck feature measurements that reflect the distances between the actual facial and neck features of the patient are compared by processor 210 to features indicative of sleep disorders such as in a data record. The data record may be part of the application. This data record can include, for example, a lookup table accessible by processor 210, which may include patient facial feature distances/values correlated with sleep disorders. Multiple tables may be included in the data record, many of which may correspond to ranges related to categorization of a sleep disorder. The analysis engine performs a symptom-match for the patient against existing image data from patients who have been diagnosed with sleep disorders such as OSA. Various relevant anatomical areas may be highlighted to show different symptoms of sleep disorders. The areas may be measured to determine whether abnormal dimensions indicate a sleep disorder. For example, a neck measurement may determine tight tissue in the neck, which indicates a sleep disorder. The areas may further be analyzed by determining visual characteristics such as color or textures that are further indications of sleep disorders. For example, the eyes may be identified and the color may be analyzed to determine whether the patient has red-eyes.

The application may also record a video of movement of the patient and derive images from the video. The video provides better image data for determination of three-dimensional measurements. For example, a video provides data for dynamic features of a face or a neck. The still images from a video of movement are taken at different angles/head and neck positions to obtain "differential" features of a patient. The video file may be stored in the same manner as captured images.

Figure 3A:
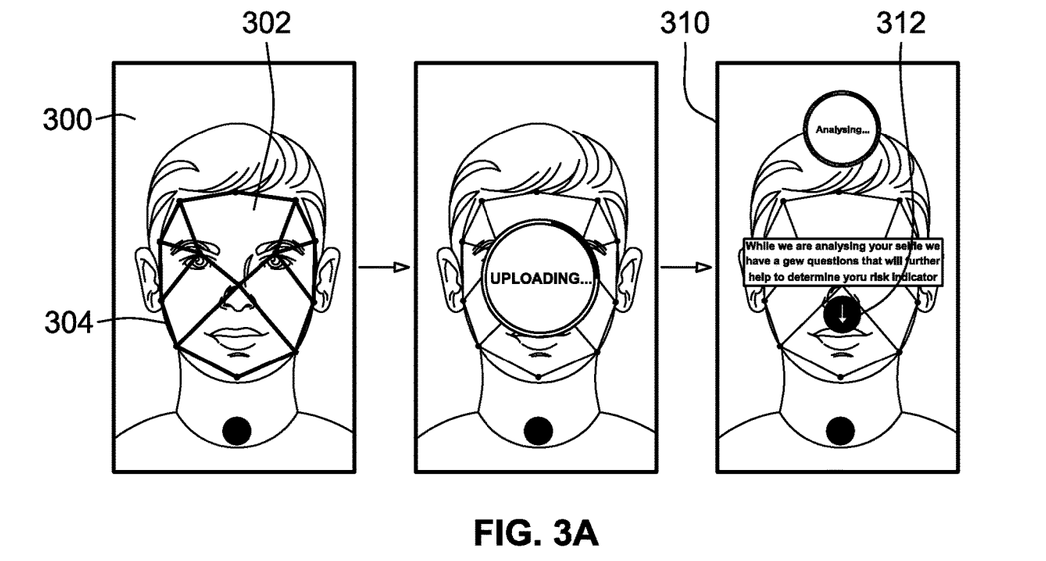
FIG. 3A are screen images of an application interface for capturing an image of a patient.

FIG. 3A shows an example interface 300 for capturing anatomical features such as facial and neck features. The interface 300 is generated by the application 260. After an image such as the image 302 is captured or a series of images or a video is captured, a grid 304 may be applied to determined different landmarks on the face and neck of the patient in this example.

Additional point markers may be derived from the image 302 to provide geodesic or surface measurements. Thus, collecting as many landmarks as possible (1000s rather than a handful) so allows construction of the facial surface. A surface is required to be able to perform geodesic measurements. Typically the geodesic measurements are between the same landmarks as the point-to-point measurements are. The collected landmarks are fit to a Statistical Shape Model (SSM) (also referred to a 3D Morphable Model (3DMM)). This gives a large amount of information, and allows linking the face scan to other data. This could include other pre-trained models such as a full head model (to calculate the conduit size), deformable mask models, comfort prediction models, or custom mask models etc. The color and image texture may be collected from the image to facilitate fitting shape models to the 2D image. Image depth may be determined via a prediction of image depth (using small changes in perception between sequential images) or it could be actual depth images collected from a device with depth sensor such as a smart phone. Similar to texture, depth data can assist with fitting and allows more accurate scaling FIG. 3A shows an uploading status interface 310 that displays a survey input selection 312. While facial data is correlated to determine anatomical features and preform sleep disorder analysis based on the image related data, the application may collect subjective patient input data through additional displayed interfaces.

Figure 3B:
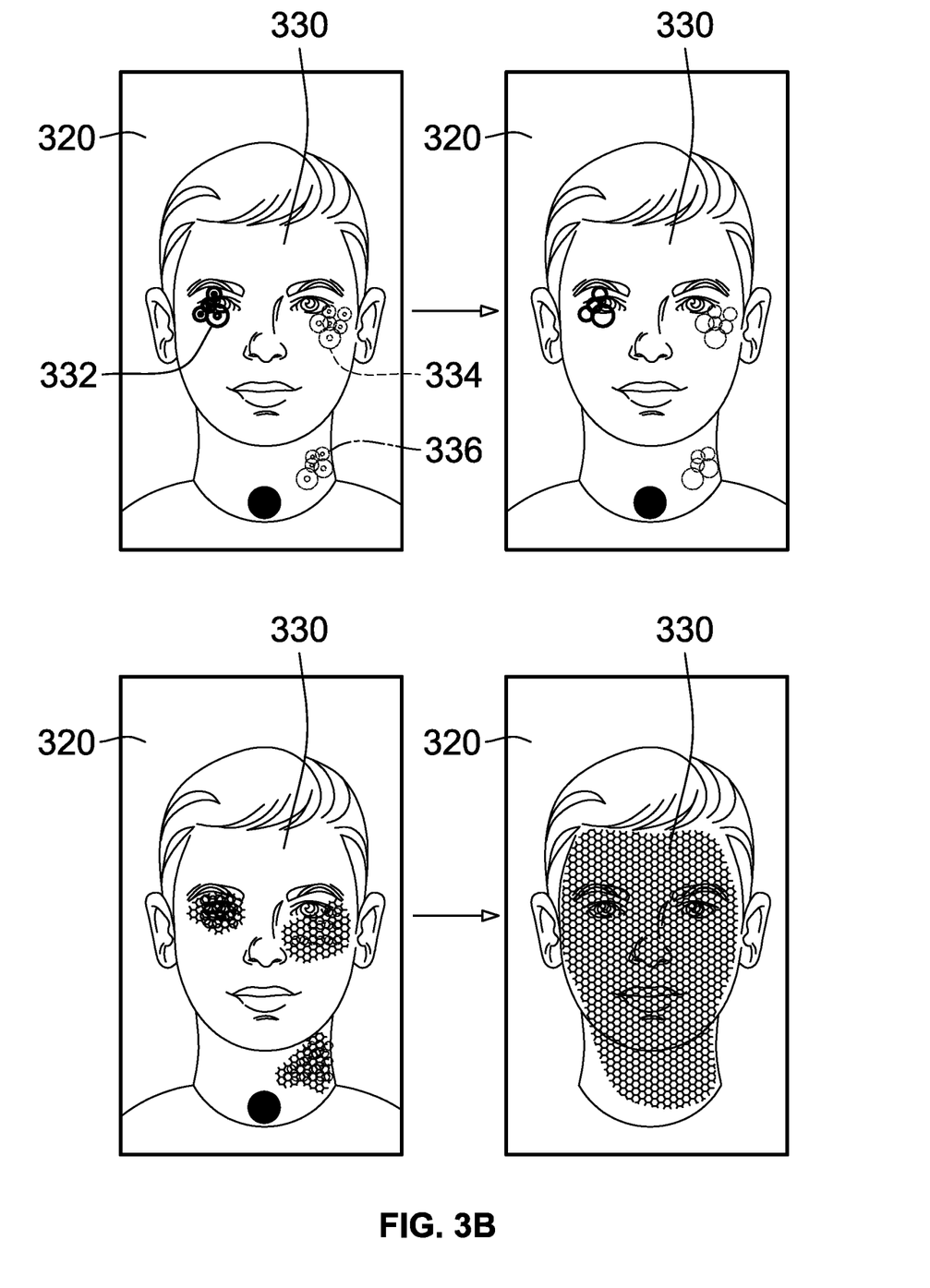
FIG. 3B are screen images of overlays on an image of a patient indicating phenotype areas of the face.

FIG. 3B shows a series of output interfaces 320 that displays different highlighted areas that may provide indications of sleep disorder. The interface 320 displays the captured image 330. An area of the eye 332 is highlighted, an area under the eye 334 is highlighted, and an area on the neck 336 is highlighted. The determined areas 332, 334, and 336 are indicators of measurements that are correlated with sleep disorders. Different data may be derived from the images in relation to identified measurements or phenotypes. In this example, the areas may be colorized to highlight the high correlation with sleep disorder.

Figure 4:
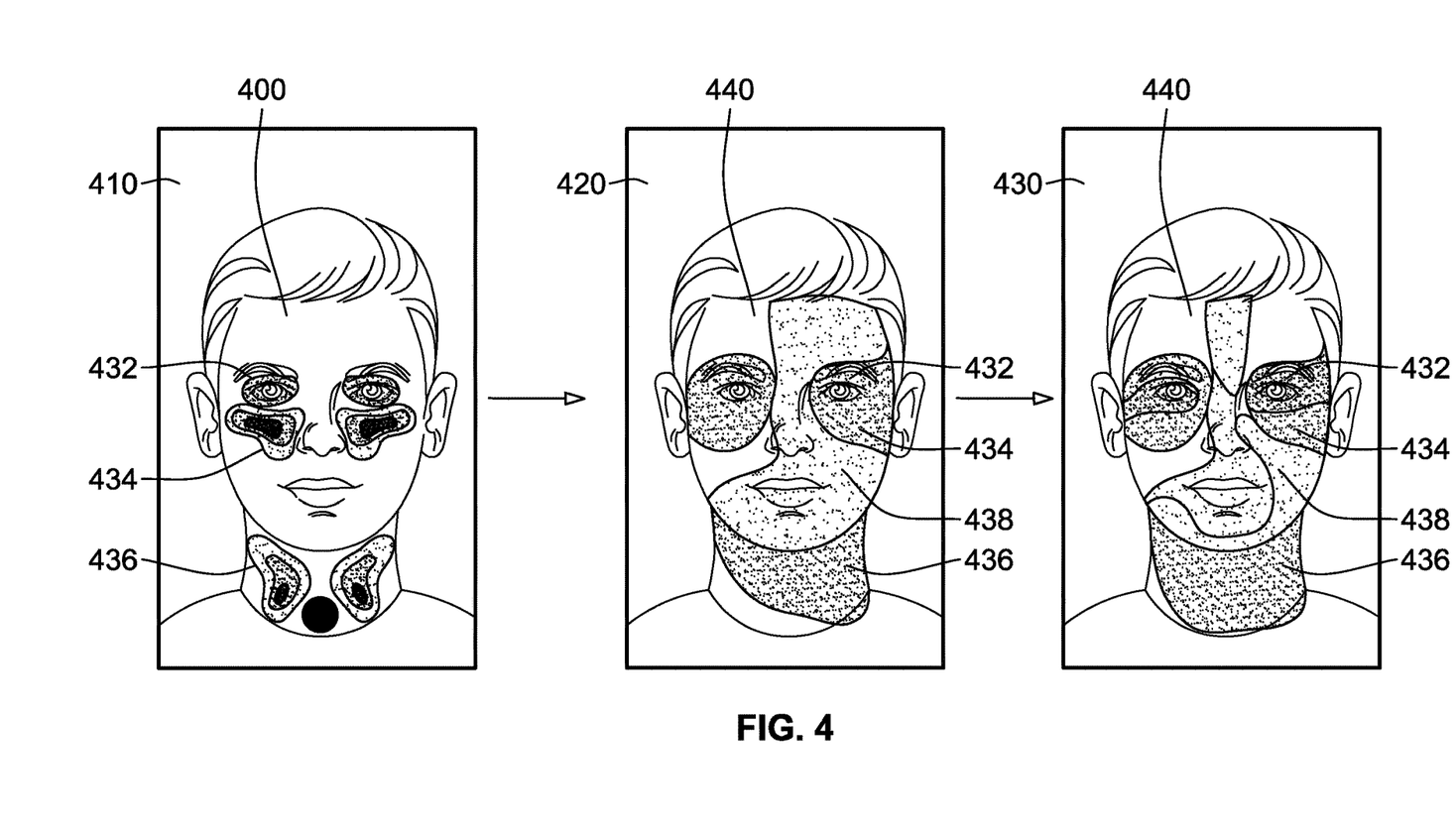
FIG. 4 are screen images of the resulting colorizing overlays on an image of a patient indicating phenotype areas of the face and the neck and correlation to sleep disorders.

Additional areas of interest may be identified from captured images. FIG. 4 shows a series of interfaces 410, 420, and 430 generated with an initial patient image 400 captured by the patient. Different areas of the image in each of the interfaces 410, 420, and 430 have been shaded with a different color to identify areas of interest in relation to sleep disorder diagnosis. For example, the images in the interfaces 410, 420, and 430 have shaded areas 432 around the eyes in a red color indicating high correlation with sleep disorder. Other areas, such as the area 434 under the eyes are shaded in a blue color indicating lower correlation with sleep disorder. Other areas such as a neck area 436 in the images of the interfaces 420 and 430 are also shaded in red to indicate a high correlation with a sleep disorder.

The images of the interfaces 420 and 430 also show a cheek area 438 and a forehead area 440 that are identified from the image data and classified. The colors of the shades may represent different classification of phenotype measurements to a sleep disorder. In this example, the classifications are colored based on correlation with a sleep disorder to assist in sleep order analysis. Thus, a color scale from green (low correlation) to red (high correlation) may be used for a final image that identifies phenotypes from areas on the anatomy shown in the image.

The sleep disorder diagnosis may be made with a combination of data. The combination of data may include: a) anatomical measurement data taken from the self-image taken from the mobile device or web camera; b) phenotype classifications based on the self-image; c) dynamic data from 3-D movement of the patient; d) physiological data collected by a patient sensor such as the sensor 150 during sleep periods; and e) subjective survey data collected from a patient after sleep periods.

Automated measurement of different anatomical features may be analyzed by determining the distance between anatomical landmarks or other types of markers. For example, in relation to the neck, a model relating neck dimensions to tissue mass and stiffness parameters may be developed. The model may then be applied to estimate airway collapsible tissue mass and stiffness parameters to be used as a feature for OSA classification. For example, if high tissue mass and low stiffness of the neck are determined relative to similar patients, this indicates an increased likelihood of sleep apnea. Thus, soft tissue of the neck may be classified as normal, obese or small for maxilla and mandible. The bony enclosure may also be measured. These two measurements may be correlated to airway size, where a normal soft tissue and larger bony enclosure would indicate a normal airway size, while obesity or small tissue and a bony structure would indicate a constricted airway size correlated with a sleep disorder. This distribution of airway tissue based on neck features and bone features of facial structure may predict increased likelihood of positional sleep apnea—e.g. where the supine event rate is significantly higher than in other positions. The prediction of a sleep disorder and the severity based on the measurements of different features may also be used to output a recommended therapy or treatment. For example, identifying positional sleep apnea based on the distribution of airway tissue could output a patient treatment involving positional specific therapies. Another example is if the anatomical model predicts either a large tongue or other soft tissue, or excessively elastic tissue anteria to the airways, the patient would be considered to be more prone to positional sleep apnea.

In relation to phenotypes, sleep disorder affected phenotypes may be detected from analysis of the collected images. Sleep disorder related phenotypes may be classified from the anatomical images of the patient. Such phenotypes may be classified as those of interest based on studies of patients with sleep disorders and observed phenotypes. Such data may be loaded into the database 160 for purposes of phenotype classification. Examples of phenotypes relating to sleep disorders may be obesity/neck circumference (linked to severity of sleep apnea), inset jaw/mandibular linked to more collapsible airway during sleep, and a crowded/narrow upper airway. Another set of factors that may be associated with sleep orders and their severity may include: High AHI v low AHI; ratio of apneas to hypopneas; sleep fragmentation; snore severity/frequency; prevalence of respiratory effort related arousals; severity of daytime sleepiness; cognitive impairment; morning headaches; nocturia, hypertension; types of breathing instability (high loop gain); arousal threshold (e.g. does the patient wake up during mild flow limitation, or after a long apnea); sympathetic/parasympathic tone; stress; anxiety; and depressive symptoms. These factors may also be used to suggest one or more optimal therapies for the user (e.g. CPAP, positional therapy, mandibular devices). It may also be used to better optimize one or more parameters of therapy such as the settings for a CPAP.

Patients may be classified based on classification of sleep disorder phenotypes. The phenotype classification may be correlated with different types of therapies as part of the recommendation. For example, certain phenotypes may indicate appropriateness of nerve stimulation or positional therapy. Other phenotypes may be used to select equipment or accessories for therapy equipment such as the type of mask for a RPT device.

The phenotype data may also be correlated to the risk of co-morbidities for the patient and a recommendation for treatment of the co-morbidity. For example, a diagnosis of a co-morbidity such as diabetes may result in a recommendation for diet modification and/or exercise as complementary therapy. Another example is a diagnosis of insomnia where cognitive therapy may be recommended.

Diagnosis and treatment of OSA may incorporate the process of detecting tiredness as a symptom of OSA from the image analysis. Thus, the image analysis may determine dark circles under eyes by detecting area under the eye with discoloration/darker skin color compared to rest of face/normal skin color of person. A second symptom detected may be bloodshot eyes. This may be determined by segmenting white areas of the eyes of the facial image. The number of pixels which are red may be determined. The routine may then determine if the ratio of red to white pixels within the eye area is above a pre-determined threshold of "normal" versus "bloodshot" eyes. Another symptom may be droopy eyes that may be detected by determining the aspect ratio of an open eye in the image. Preferably, a benchmark is used to avoid anatomical biases e.g. ethnicity-related anatomical features. Such a benchmark may be obtained by capturing an image of a person when instructing them to open their eyes as big as they can and measure that against their "resting" eye shape. Another symptom may be reaction time, that may be determined via a test executed by the application such as displaying a marker for the user to follow. The reaction of the eyes to the marker may be measured based on how accurately the eyes can track the marker or the lag from displaying a marker and the eye tracking the movement of the marker. Another symptom may be the skin color of the patient. For example, a patient may be more flushed after treatment for OSA and thus a comparison of color of facial images before and after treatment may be used.

The image analysis may also provide a measure of "tiredness." The change of tiredness throughout the day may be indication of OSA or even severity. For example, a severe OSA patient may wakes up and be assigned a tiredness rating of 8/10. The OSA patient may stay tired throughout the day and peak at 10/10 tiredness after lunch or at night. A normal non-OSA person wakes up refreshed and is low on the tiredness score (e.g. 1 or 2 out of 10). As the day goes on, the normal person may experience progressive tiredness to a "normal" degree perhaps peaking at 4 or 5 at certain parts of the day/night. Flux or rate of change of tiredness throughout the day may be an OSA predictor. For example, a person that is not suffering from OSA may wake up refreshed and get tired a "normal" amount throughout the day. In contrast, a patient suffering from OSA, wakes up tired and stays tired throughout the day.

2D image analysis may also be incorporated. For example, 2D image(s) may be used to predict the rest of the head/neck. This may be accomplished by using a paired PCA model for example. The prediction preferably incorporates multiple 2D images such as various front and side views, from below, and from above. The estimation of neck dimensions may incorporate other dimensions determined from the image. For example, width of neck may be used to obtain frontal circumference.

In addition, 2D images taken over time make be incorporated for additional analysis. For example, sequential 2D images during taking a breath and immediately thereafter may provide additional data. For example, if a user is taking a big breath before talking or during rest, this may be indicator of OSA. 2D images showing the movement or turning of head and opening or closing of the jaw may be used to determine the biomechanics of the jaw. 2D images showing a patient seated versus images of the patient lying down may show the effect of gravity on soft tissue. Such images may also be used to determine a likelihood of airway compression during sleep. 2D images of eye blinking and gaze tracking may determine indicators of tiredness. 2D images showing a mouth open may be an indicator of mouth breathing. 2D images of posture may be used to determine tiredness.

In this example, patient input of subjective data may be collected via a user application executed on the computing device 230. The user application may be part of the user application 260 that instructs the user to obtain the facial and neck landmark features or a separate application. This may also include subjective data obtained via a questionnaire with questions to gather data on symptoms of sleep disorders.

For example, questions may relate to relevant user behavior such as sleep characteristics. The subjective questions can include questions such as do you wake up with a dry mouth?, are you a mouth breather?, or what are your comfort preferences? Such sleep information may include sleep hours, how a user sleeps, and outside effects such as temperature, stress factors, etc. Subjective data may be as simple as a numerical rating as to comfort or more detailed response. Such subjective data may also be collected from a graphical interface. Objective data such as patient demographic data including age, gender or location may also be collected from the interface. The application may also include an interface that has specific questions to refine phenotype classification or questions from standard sleep related surveys. Such standard surveys may include STOP BANG, Berlin, Pittsburgh sleep quality, insomnia severity index, and chronic fatigue index. There may be multiple surveys. In addition, subjective data may be combined with the anatomical image for more accurate diagnosis. For example, certain anatomical features may predict high Apnea Hypopnea Index (AHI), but anxiety predicts high sympathetic activity, so the disease looks mild. Such questions may be asked with the display of an image of the patient with the specific phenotype identified to assist the patient in providing the information.

The collected patient input data may be assigned to the patient database 160 in FIG. 1. The application may ask additional questions via an interface to assist in selecting therapy or treatment. For example, the survey may record patient responses to questions such as would you prefer therapy A over therapy B. Other subjective data may be collected related to the psychological safety of the patient in relation to potential treatments. For example, questions such as whether the patient feels claustrophobic wearing a mask or how psychologically comfortable does the patient feel wearing the mask next to their bed partner may be asked and inputs may be collected. Other questions around preferred sleeping position could also be factored in as well as questions around whether a patient likes to move around a lot at night, and would the patient prefer 'freedom' in the form of a tube up mask that allows for more movement. Alternatively, if the patient tends to lie still on their back or side a traditional style mask with the tube coming down from the mouth would be acceptable. The subjective input data from patients may be used as an input for both diagnosis of sleep disorder and effectiveness of a treatment for the sleep disorder.

The sleep disorder scores may be used by health care professionals to recommend treatment and therapy. The health care professions may also receive the treatment effectiveness score. A preliminary sleep consultation with a health care professional may be conducted through the application, or a telemedicine consultation may be provided to the patient for greater convenience. The consultation may result in recommendation of treatments based on the data as well as the determined severity of the sleep disorder. For example, if the sleep disorder is determined from the input data as mild, therapies such as mandibular repositioning devices (MRD), positional, nerve stimulation, cognitive behavioral treatment (CBT) or cognitive behavioral treatment for insomnia (CBTi), and the like may be recommended. If the sleep disorder is more severe, a personal consultation may be recommended and treatment devices such as an RPT, medication, or an automated sleep coaching program may be provided.

After an initial score determination, the system 100 continues to collect data related to the patient. For example, if a patient in the first group represented by patient 162 is diagnosed with sleep disorder and prescribed a treatment, the patient may then be considered in the second group of patients represented by the patient 164. Additional follow up data as to whether the treatment was effective and the accuracy of the diagnosis may be added to the database 160. The feedback from new patients to the second group represented by the patient 164 may be used to refine determinations of sleep disorder and treatment effectiveness. Further, the patients in the second group represented by the patient 164 may update their respective image and other data periodically. This allows prediction of future disease or symptoms based on periodic reassessment of the new data.

If a therapy is recommended, the therapy data may be used to confirm the screening result, i.e. combining data from therapy or treatment devices and data from questionnaire/screener interfaces for the second group of patients represented by the patient 164 to augment the prediction of OSA.

For example, in certain markets, a health care provider can recommend a treatment device such as a RPT for a trial period (e.g., 4 weeks) during which the system 100 can continue to compare results from the treatment device and provide further recommendations. The system 100 may also recommend a therapy to treat the sleep disorder and continue to monitor the patient. If the initial therapy fails, another therapy may be recommended.

Data correlation may occur based on analysis of a population of patients with known sleep disorders. Images may be collected from such patients in conjunction with applications on computing devices operated by such patients. Such an application uses a process similar to the image process described above. Other physiological factors from the patients may be collected from physiological sensors. Alternatively, additional data may be collected from therapy devices such as a RPT. Additionally, survey data similar to that detailed above may be collected.

As explained above operational data of each RPT may be collected for a large population of patients. This may include usage data based on when each patient operates the RPT. Thus, compliance data such as how long and often a patient uses the RPT over a predetermined period of time may be determined from the collected operational data. Leak data may be determined from the operational data such as analysis of flow rate data or pressure data. Mask switching data using analysis of acoustic signals may be derived to determine whether the patient is switching masks.

The collection of data may be used to train a machine learning model to correlate images of phenotype characteristics with sleep disorders. Another application may include use of machine learning to correlate phenotype classifications with sleep disorders for the most effective treatment. The inputs for the machine learning model may include a variety of data that may be evaluated in the model design process. In this example, the inputs for the machine learning model include physical measurements of facial and neck features, phenotypes derived from facial and neck images, physiological data, and patient input data. The training set is derived from data taken from the second group of patients represented by the patient 164 in FIG. 1 and includes sleep disorder data as well as the treatments taken from the patients. For example, the treatments may include use of a device such as a RPT, medication, cognitive behavioral therapy for insomnia (CPTi), mandibular advancement device/surgery, hypoglossal nerve stimulation for insufficient muscle activation during sleep, and nasal congestion treatments such as nasal sprays.

In this example, the machine learning model outputs a sleep disorder likelihood score and a treatment effectiveness score. The machine learning model is trained and internal weights are adjusted based on the training data set. After evaluation against the training set, the model may be deployed after reaching a predetermined accuracy level for both the sleep disorder likelihood score and the treatment effectiveness score. The machine learning model may then be deployed on the server 110 in FIG. 1 for evaluation of the first group of patients represented by the patient 162.

In this example the machine learning model is a neural network. The neural network may be a multilayer perceptron (MLP) neural network model with no direct connections between nodes and the use of one or more hidden layers. The neural network MLP model adjusts internally derived calculated weights between each of the established node connections by minimizing an error function against actual values during the training process. Other examples of machine learning models may include a decision tree ensemble, a support vector machine, a Bayesian network, or a gradient boosting machine. Such structures can be configured to implement either linear or non-linear predictive models.

Unsupervised machine learning may also be used to discover additional correlations between physical features and phenotypes to sleep disorders. Machine learning may employ techniques such as neural networks, clustering or traditional regression techniques. The training data may be used to test different types of machine learning algorithms for the machine learning and determine which one has the best accuracy in relation to predicting either sleep disorders or treatment effectiveness.

The machine learning model for determining a sleep disorder score and a treatment effectiveness score may be continuously updated by new input data from the system in FIG. 1. Thus, the model may become more accurate with greater use by the system 100.

Figure 5:
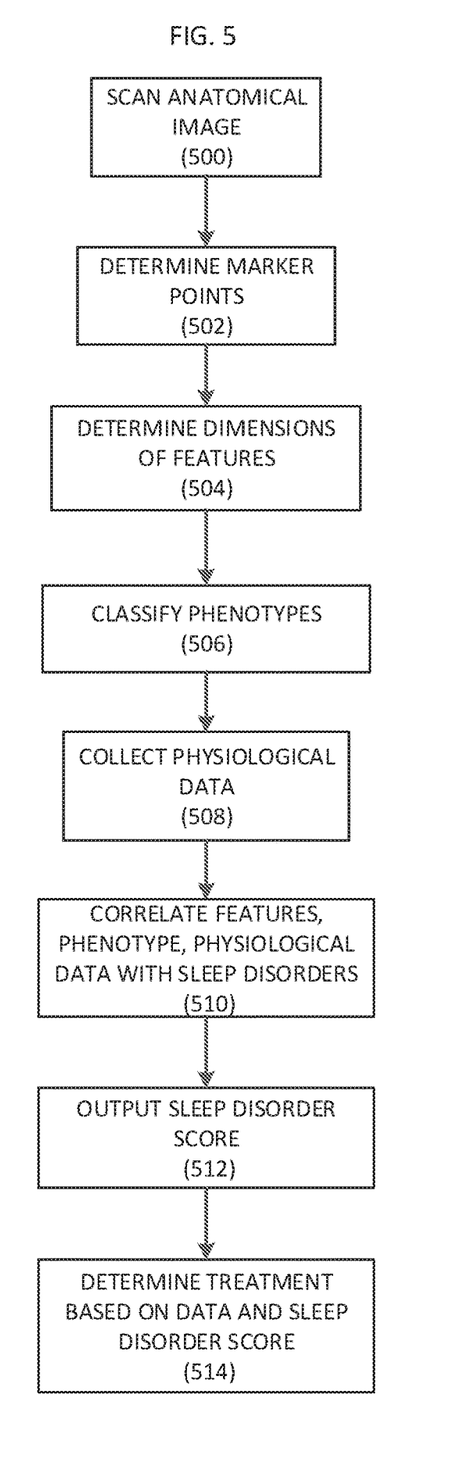
FIG. 5 is flow diagram of the process of collecting image data for a patient based on scanning and analysis of patient input for sleep disorder diagnosis.

FIG. 5 is a flow diagram of the process of sleep disorder analysis that may be executed by the server 110 in FIG. 1. The process collects an image of the face and the neck of the patient. In this example, the face and neck of the patient is scanned via a depth camera on a mobile device such as the smartphone 134 or the tablet 136 in FIG. 1 to produce a composite 3D image of the face and neck (500). Alternatively, 3D facial scan data may be obtained from a storage device with already scanned 3D facial images of the patient or from a recorded video. Landmark points are determined in a facial and neck mesh from the 3D scan (502). The key dimensions and collection of points for features in relation to analysis of sleep disorders, are measured from the images (504).

The images are then analyzed to classify phenotypes related to sleep disorders (506). Physiological data is collected from sensors such as the sensor 150 in FIG. 1 (508). The feature dimensions, physiological data and classified phenotypes are then correlated with sleep disorders (510). A sleep disorder score is then determined and output from the input data (512). The machine learning model may also determine a treatment based on the input data and the sleep disorder score (514).

The flow diagram in FIG. 5 is representative of example machine readable instructions for collecting and analyzing data to evaluate the likelihood of a sleep disorder in a patient. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithms are described with reference to the flowchart illustrated in FIG. 5, persons of ordinary skill in the art will readily appreciate that many other methods of implementing the example machine readable instructions may alternatively be used. For example, the order of execution of the blocks may be changed, and/or some of the blocks described may be changed, eliminated, or combined.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

One or more elements or aspects or steps, or any portion(s) thereof, from one or more of any of the claims below can be combined with one or more elements or aspects or steps, or any portion(s) thereof, from one or more of any of the other claims or combinations thereof, to form one or more additional implementations and/or claims of the present disclosure.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A method to determine a sleep disorder in a patient, the method comprising:
    capturing a digital image including a face and a neck of the patient by a camera;
    measuring features of the face and the neck from the digital image by determining landmarks on the digital image via a processor;
    classifying at least one phenotype from the image from previously identified phenotypes stored in a database via the processor;
    correlating the at least one phenotype and the measurements of at least one feature with a sleep disorder via the processor;
    determining a risk score of the sleep disorder based on the correlation of the phenotype and the measurements of the at least one feature via the processor, wherein the phenotype is coded by a color on the image, and wherein the color code on the phenotype represents a degree of correlation with the sleep disorder; and
    displaying the image and the color code on a display.

2. The method of claim 1, further comprising providing multiple images including the face and neck of the patient.

3. The method of claim 1, further comprising measuring a physiological reading from the patient, and wherein the risk score of the sleep disorder is determined based partly on the physiological reading.

4. The method of claim 1, wherein the correlation is performed with a machine learning model trained with a plurality of images from a patient population and a sleep disorder score of each of the patient population.

5. The method of claim 4, further comprising:
    storing the image, classified phenotype, dimensions of the feature and sleep disorder score; and updating a database of the patient population with the stored classified phenotype, dimensions of the features, and sleep disorder score for the patient.

6. The method of claim 1, wherein the sleep disorder is one of Obstructive Sleep Apnea (OSA), a form of Sleep Disordered Breathing (SDB), Cheyne-Stokes Respiration (CSR), Obesity Hyperventilation Syndrome (OHS) and Chronic Obstructive Pulmonary Disease (COPD).

7. The method of claim 1, further comprising determining a risk score of a co-morbidity based on the at least one phenotype.

8. The method of claim 1, further comprising:
providing a video of the patient;
determining dynamic movement of one of the features from the video, and wherein the risk score of the sleep disorder is determined with the dynamic movement.

9. The method of claim 1, wherein the at least one phenotype is selected from one of the group of obesity/neck circumference, inset jaw/mandibular, and crowded/narrow upper airway.

10. The method of claim 1, further comprising:
determining a severity of the sleep disorder based on the determined sleep disorder score; and
determining a therapy based on the severity of the sleep disorder.

11. The method of claim 1, wherein the feature is a neck dimension, wherein the neck dimension is correlated to a tissue mass and a stiffness parameter, and wherein the sleep disorder correlation relates to the tissue mass and the stiffness parameter.

12. The method of claim 1, further comprising matching a treatment for the sleep disorder based on the determined phenotype.

13. A non-transitory computer readable medium comprising instructions which, when executed by a computer, cause the computer to carry out;
capturing a digital image including a face and a neck of the patient from a camera;
measuring features of the face and the neck from the image by determining landmarks on the image;
classifying at least one phenotype from the image from previously identified phenotypes stored in a database;
correlating the at least one phenotype and the measurements of at least one feature with a sleep disorder;
determining a risk score of the sleep disorder based on the correlation of the phenotype and the measurements of the at least one feature, wherein the phenotype is coded by a color on the image, wherein the color code on the phenotype represents a degree of correlation with the sleep disorder; and
displaying the image and the color code on a display.

14. A system to determine a sleep disorder in a patient, the system comprising:
a camera configured to capture a digital image including a face and a neck of the patient;
a database storing previously identified phenotypes and dimensions of facial and neck features;
a display;
a processor coupled to the camera, the display, and the database, the processor operable to:
identify features of the face and the neck from the image by determining landmarks on the image;
classify at least one phenotype from the image based on comparisons with the database;
correlate the at least one phenotype and at least one feature with a sleep disorder; and
determine a risk score of the sleep disorder based on the correlation of the phenotype and the feature, wherein the phenotype is coded by a color on the image, and wherein the color code on the phenotype represents a degree of correlation with the sleep disorder; and
display the image and the color code on the display.

15. The system of claim 14, further comprising a sensor interface coupled to the processor and a sensor measuring a physiological reading from the patient, and wherein the risk score of sleep disorder is determined based partly on the physiological reading.

16. The system of claim 14, wherein the correlation is performed with a machine learning model trained with a plurality of images from a patient population and a sleep disorder score of each of the patient population stored in the database, and wherein the processor is further operable to:
store the image, classified phenotype, dimensions of the feature, and sleep disorder score in a storge device; and
update the database with the stored classified phenotype, dimensions of the features, and sleep disorder score for the patient.

17. The system of claim 14, wherein the sleep disorder is one of Obstructive Sleep Apnea (OSA), a form of Sleep Disordered Breathing (SDB), Cheyne-Stokes Respiration (CSR), Obesity Hyperventilation Syndrome (OHS) and Chronic Obstructive Pulmonary Disease (COPD).

18. The system of claim 14, wherein the at least one phenotype is selected from one of the group of obesity/neck circumference, inset jaw/mandibular, and crowded/narrow upper airway.

19. The system of claim 14, wherein the feature is a neck dimension, wherein the neck dimension is correlated to a tissue mass and a stiffness parameter, and wherein the sleep disorder correlation relates to the tissue mass and the stiffness parameter.

20. The system of claim 14, further comprising a storage device storing a video of the patient, and wherein the processor is operable to determine dynamic movement of one of the features from the video, and wherein the risk score of sleep disorder is determined with the dynamic movement.

* * * * *